(12) United States Patent
Chou et al.

(10) Patent No.: US 12,272,991 B2
(45) Date of Patent: Apr. 8, 2025

(54) MOTOR STATOR ASSEMBLY

(71) Applicant: Sinpro Electronics Co., Ltd., Pingtung (TW)

(72) Inventors: Yu-Sheng Chou, Pingtung (TW); Hung-Han Chiu, Pingtung (TW)

(73) Assignee: SINPRO ELECTRONICS CO., LTD., Pingtung (TW)

( * ) Notice: Subject to any disclaimer, the term of this patent is extended or adjusted under 35 U.S.C. 154(b) by 699 days.

(21) Appl. No.: 17/677,382

(22) Filed: Feb. 22, 2022

(65) Prior Publication Data
US 2022/0271577 A1    Aug. 25, 2022

(30) Foreign Application Priority Data
Feb. 23, 2021   (TW) .................................. 110201960

(51) Int. Cl.
| | |
|---|---|
| H02K 1/14 | (2006.01) |
| H02K 3/18 | (2006.01) |
| H02K 3/28 | (2006.01) |
| H02K 3/50 | (2006.01) |
| H02K 5/15 | (2006.01) |
| H02K 5/22 | (2006.01) |

(52) U.S. Cl.
CPC .............. *H02K 1/148* (2013.01); *H02K 3/18* (2013.01); *H02K 3/28* (2013.01); *H02K 3/50* (2013.01); *H02K 5/15* (2013.01); *H02K 5/225* (2013.01); *H02K 2203/09* (2013.01)

(58) Field of Classification Search
CPC ............ H02K 3/18; H02K 3/32; H02K 3/325; H02K 3/38; H02K 3/50; H02K 3/52; H02K 3/521; H02K 5/15; H02K 2203/09
See application file for complete search history.

(56) References Cited

U.S. PATENT DOCUMENTS

| | | | |
|---|---|---|---|
| 11,245,301 B2 * | 2/2022 | Iga ............................ | H02K 3/28 |
| 11,689,085 B2 * | 6/2023 | Wüst ....................... | H02K 3/522 |
| | | | 310/71 |
| 2007/0278876 A1 * | 12/2007 | Haga ...................... | H02K 3/325 |
| | | | 310/260 |

(Continued)

FOREIGN PATENT DOCUMENTS

DE      102016219221 A1 *    4/2018

OTHER PUBLICATIONS

Machine translation of DE-102016219221-A1 (Year: 2016).*

*Primary Examiner* — Quyen P Leung
*Assistant Examiner* — Minki Chang
(74) *Attorney, Agent, or Firm* — MUNCY, GEISSLER, OLDS & LOWE, P.C.

(57) ABSTRACT

A motor stator assembly includes stator yoke, coil sets connected to the stator yoke, and a positioning plate removably connected to the stator yoke. Each coil set has a coil member with two terminal legs. The positioning plate has though openings. The terminal legs of each coil set extend through one of the through openings. The electrical conductor set has conductor layers and an insulating part encapsulating the conductor layers. Each conductor layer has conductor components each having connection holes exposed from the insulating part. One of the terminal legs of each coil set extends through one of the connection holes of one of the conductor components of one of the conductor layers.

10 Claims, 10 Drawing Sheets

(56) References Cited

U.S. PATENT DOCUMENTS

| | | | | |
|---|---|---|---|---|
| 2010/0156208 A1* | 6/2010 | Schaflein | ............... | H02K 7/006 |
| | | | | 310/71 |
| 2016/0294248 A1* | 10/2016 | Atarashi | ................ | H02K 5/16 |
| 2018/0233984 A1* | 8/2018 | Ogawa | ................ | H02K 5/1732 |
| 2020/0153307 A1* | 5/2020 | Abdallah | ............... | H02K 3/522 |
| 2021/0152044 A1* | 5/2021 | Yoshikawa | .............. | H02K 3/50 |
| 2021/0367474 A1* | 11/2021 | Galloway | ............... | H02K 5/22 |

* cited by examiner

MOTOR STATOR ASSEMBLY

CROSS-REFERENCE TO RELATED APPLICATION

This application claims priority to Taiwanese Patent Application No. 110201960, filed on Feb. 23, 2021.

FIELD

The disclosure relates to a motor stator assembly.

BACKGROUND

An existing motor stator assembly includes a stator yoke, a plurality of coil sets, and a wiring device. The coil sets are connected the stator yoke. Each coil set includes a coil member that has two terminal legs. The wiring device is connected to the stator yoke and is composed of a plurality of conductor components and a plurality of insulating parts. The terminal legs of the coil member of each coil set extend into the wiring device and contact with one of the conductor components so that the coil sets are conductively connected to the wiring device.

However, because the wiring device is formed by first assembling a number of the conductor components into each of the insulating parts, followed by subsequent assembly of the insulating parts incorporating the conductor components, assembly of the wiring device is inconvenient and time consuming. Besides, over a long period of use, the conductor components can become loose from the insulating parts, thereby resulting in poor electrical connection between the coil sets and the wiring device. Therefore, there is a need to improve the existing motor stator assembly.

SUMMARY

Therefore, an object of the disclosure is to provide a motor stator assembly that is easy to assemble and that saves assembly time.

According to the disclosure, a motor stator assembly includes a stator yoke, a plurality of coil sets, a positioning plate, and an electrical conductor set.

The coil sets are connected to the stator yoke. Each of the coil sets has a coil member (31) that has two terminal legs.

The positioning plate is removably connected to the stator yoke, and has a plurality of through openings and at least two positioning members. Each of the through openings has a polygonal cross section. The terminal legs of the coil member of each of the coil sets extend through one of the through openings and respectively abutting two corners of the one of the through openings. The at least two positioning members are spaced apart from each other and protrude from the positioning plate in a direction away from the stator yoke.

The electrical conductor set is disposed on the positioning plate and positioned by the at least two positioning members, and has a plurality of conductor layers and an insulating part. The conductor layers is spaced apart from each other in an axial direction of the stator yoke. Each of the conductor layers has a plurality of conductor components. Each of the conductor components has a plurality of connection holes. The insulating part encapsulates all of the conductor layers and is positioned between the at least two positioning members. Each of the connection holes of each of the conductor components is exposed from the insulating part. One of the terminal legs of the coil member of each of the coil sets extends through one of the connection holes of one of the conductor components of one of the conductor layers.

The two terminal legs of the coil member of each of the coil sets extend through the positioning plate and respectively engage two of the connection holes respectively formed in two of the conductor components so that the two terminal legs of each of the coil sets are respectively connected to the two of the conductor components.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
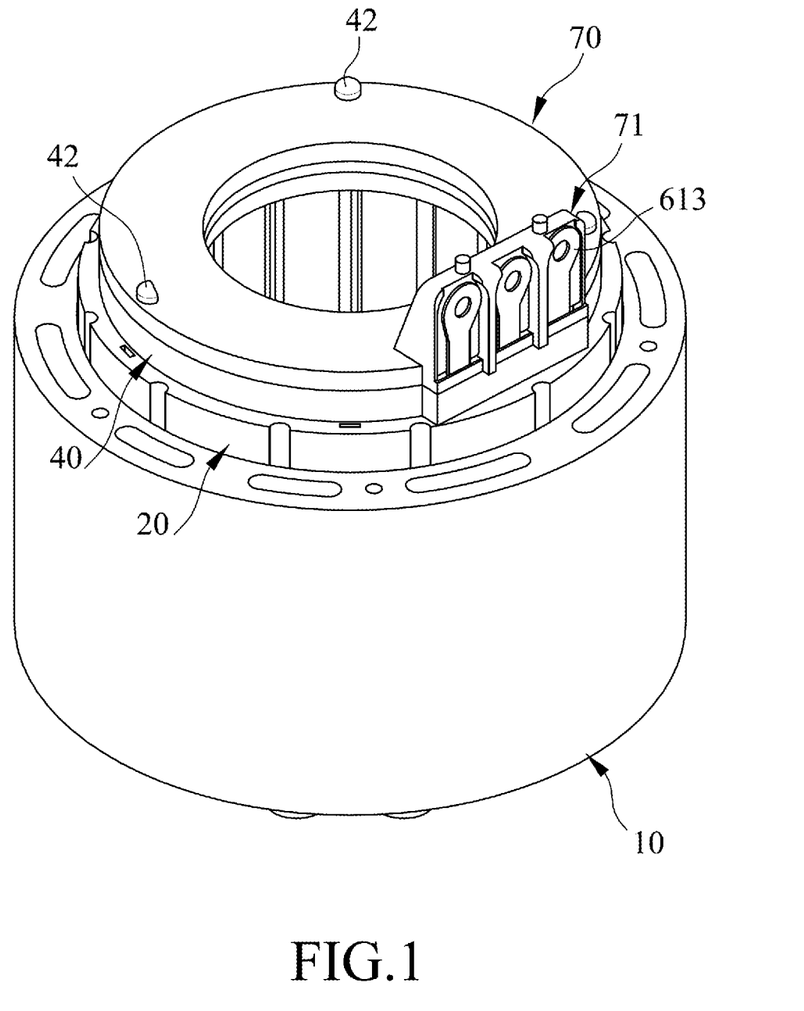
FIG. 1 is a perspective view illustrating a motor stator assembly according to a first embodiment of the disclosure.
Figure 2:
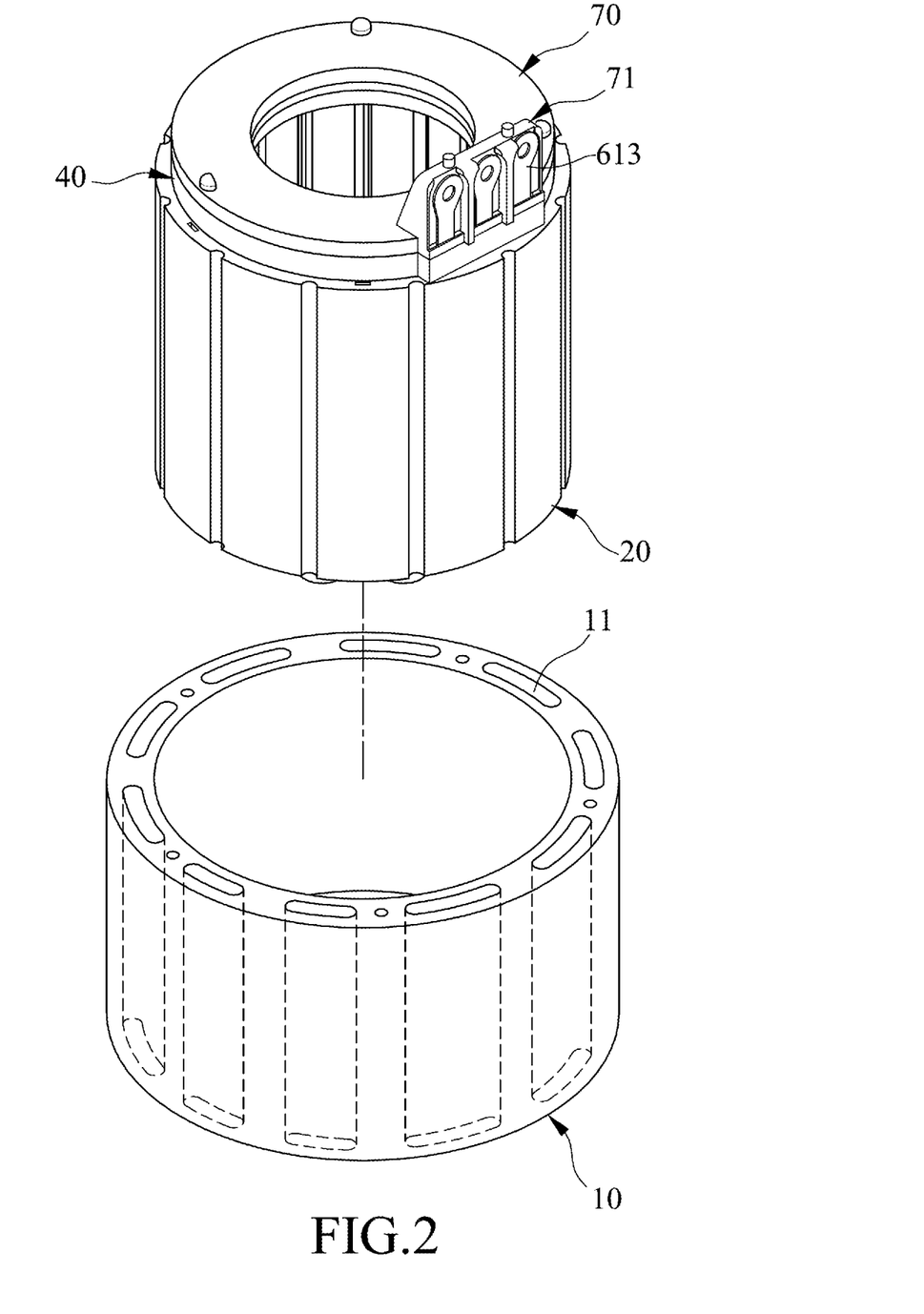
FIG. 2 is an exploded perspective view of the first embodiment illustrating an outer casing in an unassembled state.

FIGS. 1 to 4 illustrate a motor stator assembly according to a first embodiment of the disclosure. In the first embodiment, the motor stator assembly includes an outer casing 10, a stator yoke 20, a plurality of coil sets 30, a positioning plate 40, an insulating plate 50, an electrical conductor set 60, and a cover 70. As shown in FIGS. 1 and 2, the outer casing 10 has a hollow cylindrical shape and a plurality of passages 11. The passages 11 are angularly spaced apart from each other and extend axially through the outer casing 10 for passage of fluid, such as water.

Figure 3:
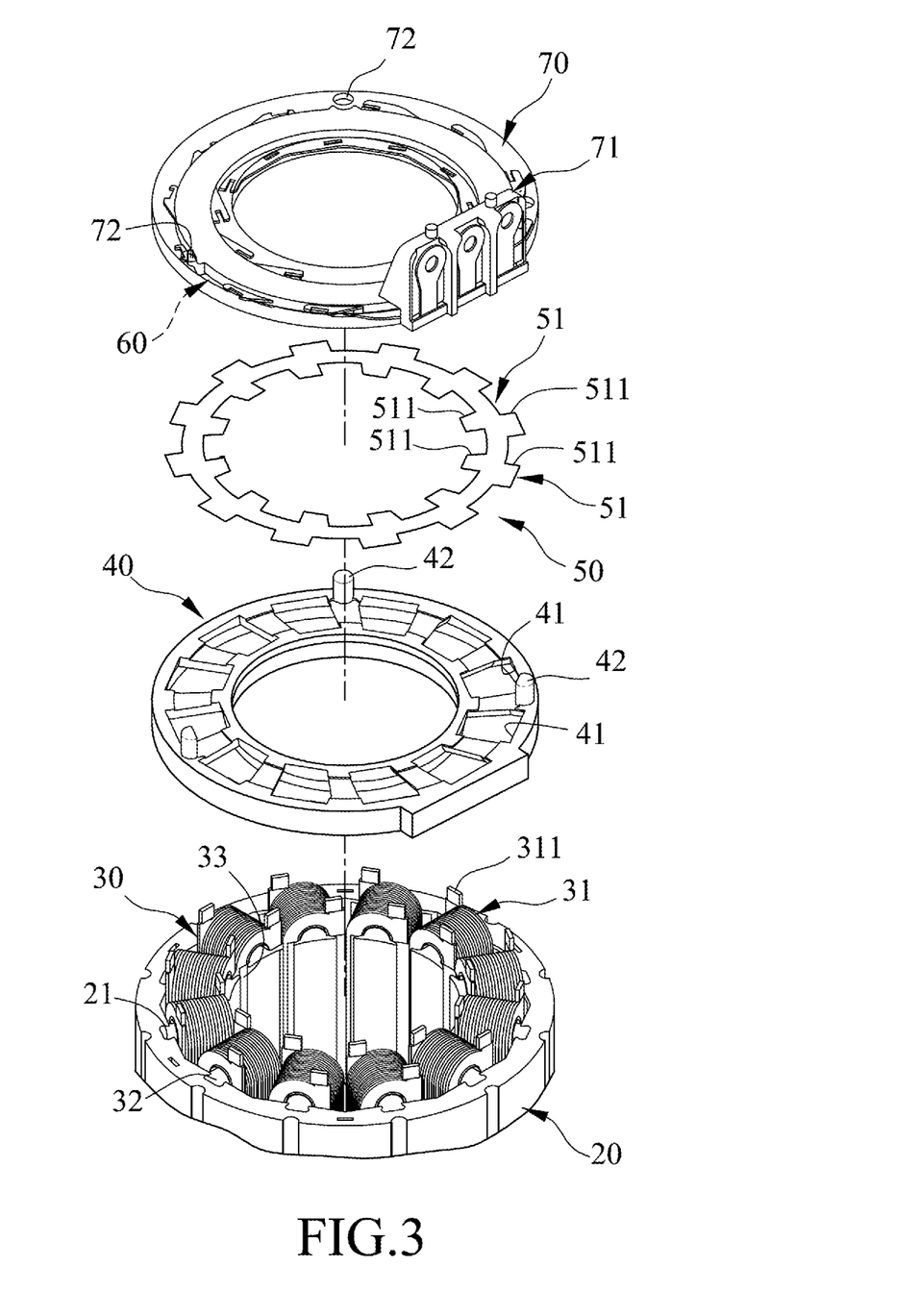
FIG. 3 is a fragmentary exploded perspective view of the first embodiment illustrating a cover, an electrical conductor set, an insulating plate, a positioning plate, a coil sets, and a stator yoke of the motor stator assembly.

As shown in FIGS. 1 and 2, the stator yoke 20 is disposed within the outer casting 10 and has an annular cross section. As shown in FIG. 3, the stator yoke 20 has a plurality of engagement slots angularly spaced apart from each other.

Each engagement slot 21 is concavely formed in an inner surface of the stator yoke 20 and extends in an axial direction of the stator yoke 20.

As shown in FIG. 3, the coil sets 30 are connected to the stator yoke 20 and disposed on the inner surface of the stator 20 in an angularly spaced manner. Each of the coil sets 30 has a coil member 31 that has two terminal legs 311. In this embodiment, each coil set 30 is removably engaged with the inner surface of the stator yoke 20. Each coil set 30 further has a stator tooth pole 32 and an insulating member 33. The stator tooth pole 32 is removably engaged into one of the engagement slots 21 and is sleeved around by the coil member 31. The insulating member 33 is disposed between the stator tooth pole and the corresponding coil member 31, thereby ensuring that the stator tooth pole 32 and the coil member 31 are insulated from each other. The coil member 31 of each coil set 30 is a flat coil.

Figure 6:
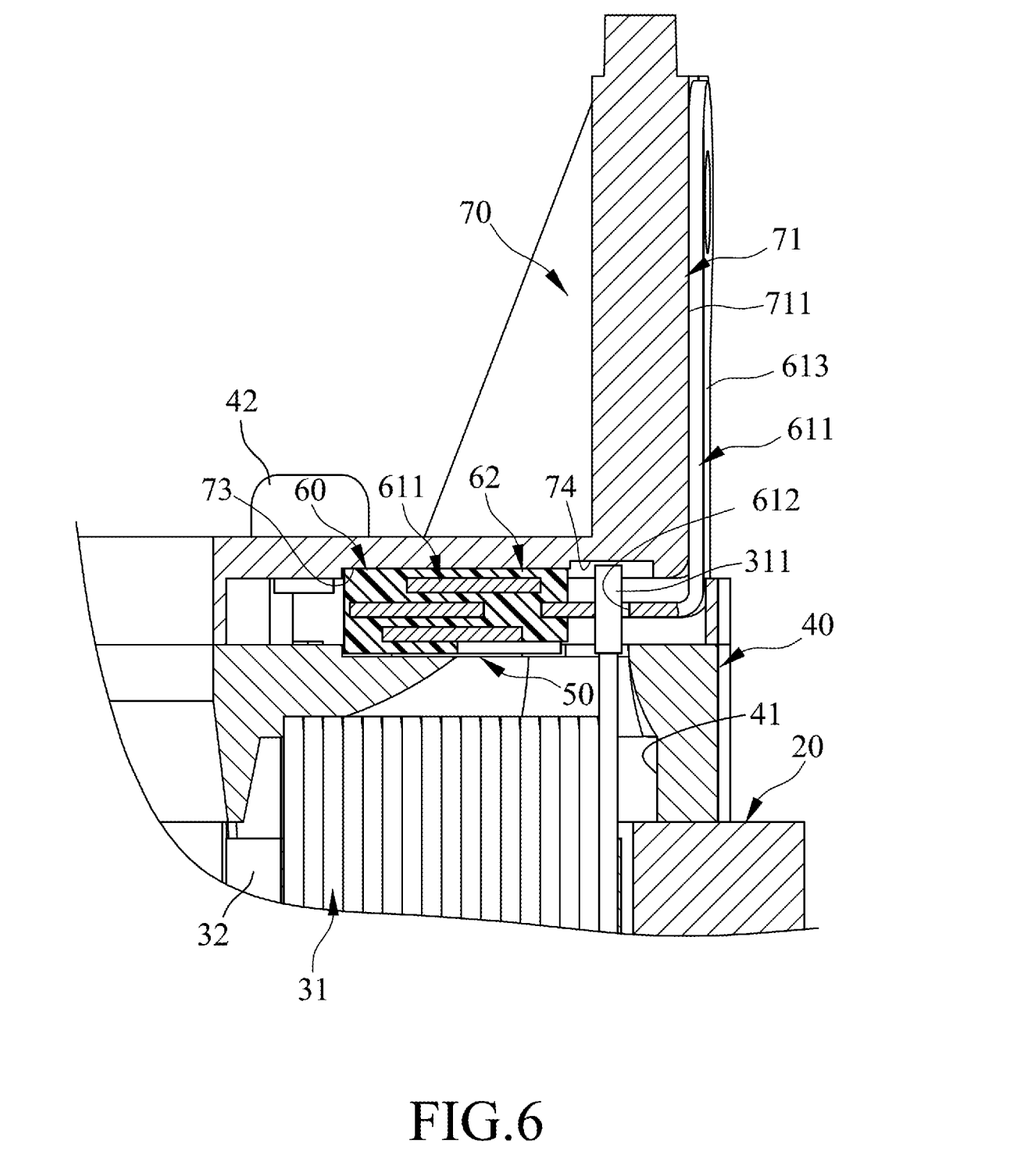
FIG. 6 is an enlarged partial sectional side view of the first embodiment illustrating the cover, the electrical conductor set, the insulating plate, the positioning plate, the coil sets, and the stator yoke.
Figure 7:
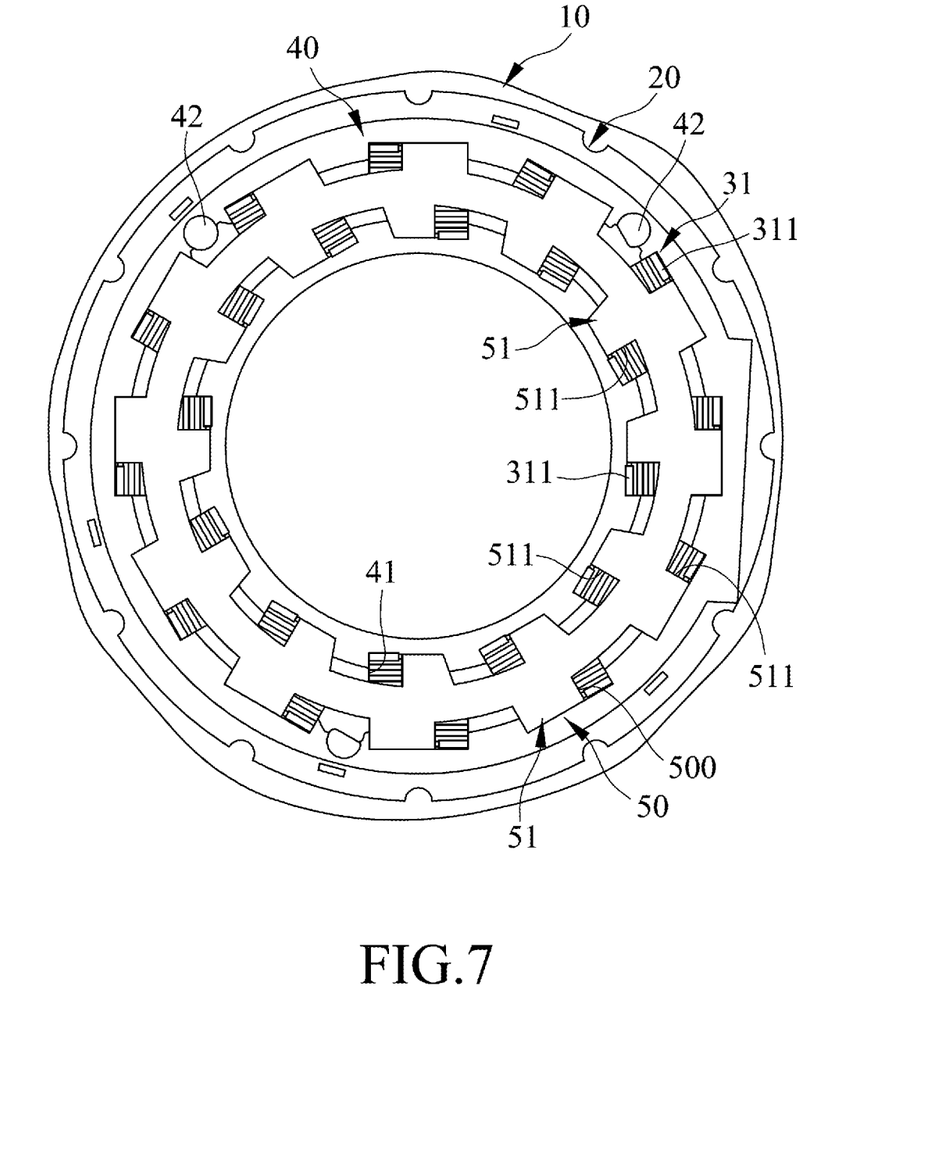
FIG. 7 is a fragmentary top view of the first embodiment.

As shown in FIGS. 3, 6, and 7, the positioning plate 40 is removably connected to the stator yoke 20, and has a plurality of through openings 41 and at least two positioning members 42. The through openings 41 are disposed on the positioning plate 40 and angularly spaced at intervals. Each through opening 41 has a polygonal cross section and is disposed in a position corresponding to one of the coil sets 30. The terminal legs 311 of the coil member 31 of each of the coil sets 30 extend through one of the through openings 41 and respectively abut two corners of the respective one of the through openings 41. The positioning members 42 are spaced apart from each other and protrude from the positioning plate 40 in a direction away from the stator yoke 20. Particularly, the positioning members 42 of the positioning plate 40 are angularly spaced at unequal intervals. An angle formed between two lines which respectively connect the at least two positioning members 42 to the center of the positioning plate 40 is less than or greater than 180 degrees, and is hereinafter referred to as an angular distance between the two positioning members 42. Furthermore, the two positioning members 42 of the positioning plate 40 are different in shape. As shown in FIGS. 3 and 7, in this embodiment, the positioning plate 40 includes three positioning members 42. An angular distance between two adjacent ones of the positioning members 42 is different from an angular distance between the other two adjacent ones of the positioning members 42. At least one of the positioning members 42 is different in shape from the other one of the positioning members 42.

As shown in FIGS. 3, 6, and 7, the insulating plate 50, which is annular, is disposed on the positioning plate 40, and has a plurality of shielding members 51. The shielding members 51 are annularly spaced apart from each other. Each shielding member 51 corresponds in position to one of the through openings 41 and has two opposite passages 511. The opposite passages 511 of each shielding member 51 corresponds in position to the terminal legs 311 of the coil member 31 of one of the coil sets 30, and the terminal legs 311 of the coil member 31 of each of the coil sets 30 respectively pass the opposite passages 511 of one of the shielding members 51 so as to extend through the insulating plate 50. Each shielding member 51 shields the coil member 31 of one of the coil sets 30 except the terminal leas 311, thereby achieving a better insulation effect.

Figure 4:
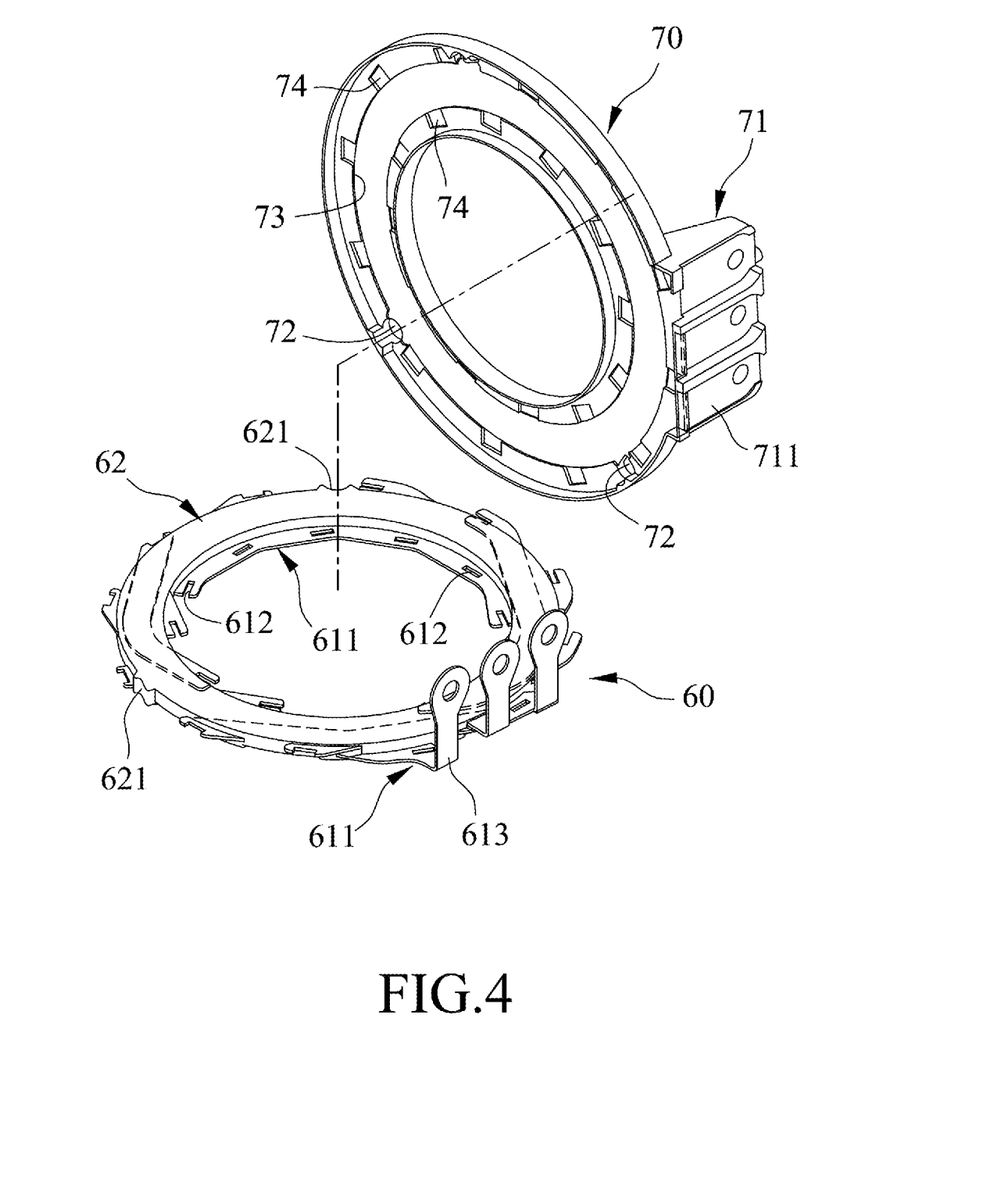
FIG. 4 is an exploded perspective view of the first embodiment illustrating the cover and the electrical conductor set.
Figure 5:
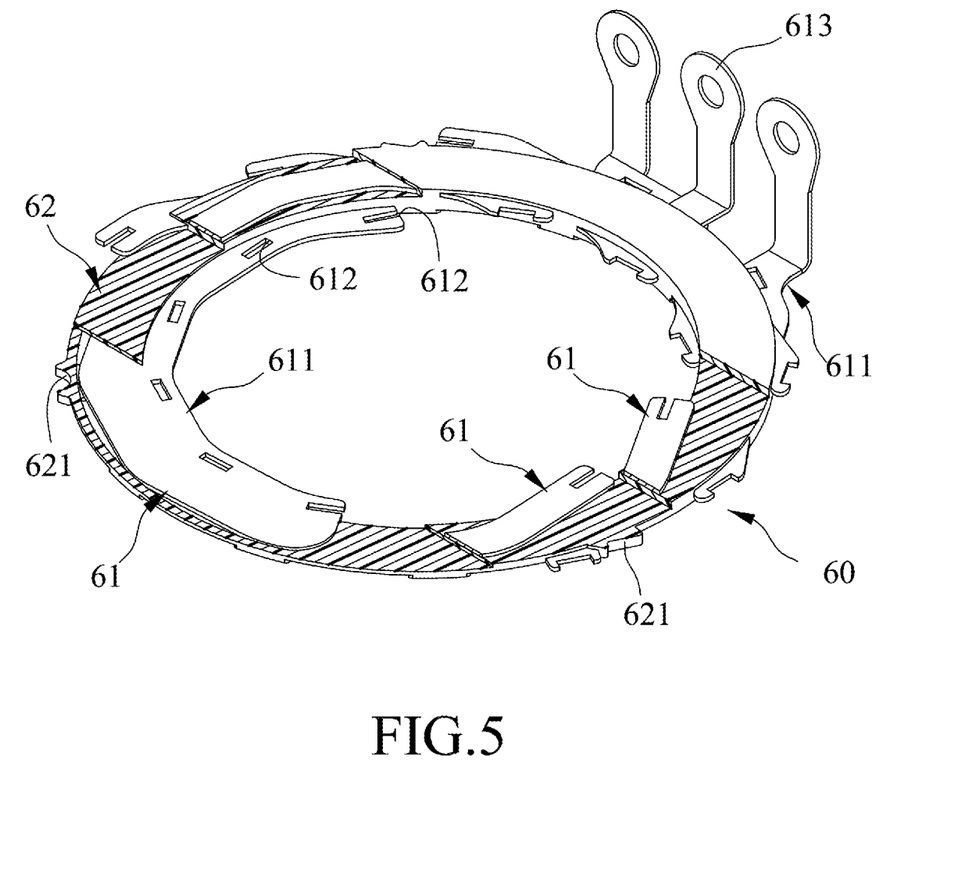
FIG. 5 is a partially sectional perspective view of the first embodiment illustrating the electrical conductor set.
Figure 8:
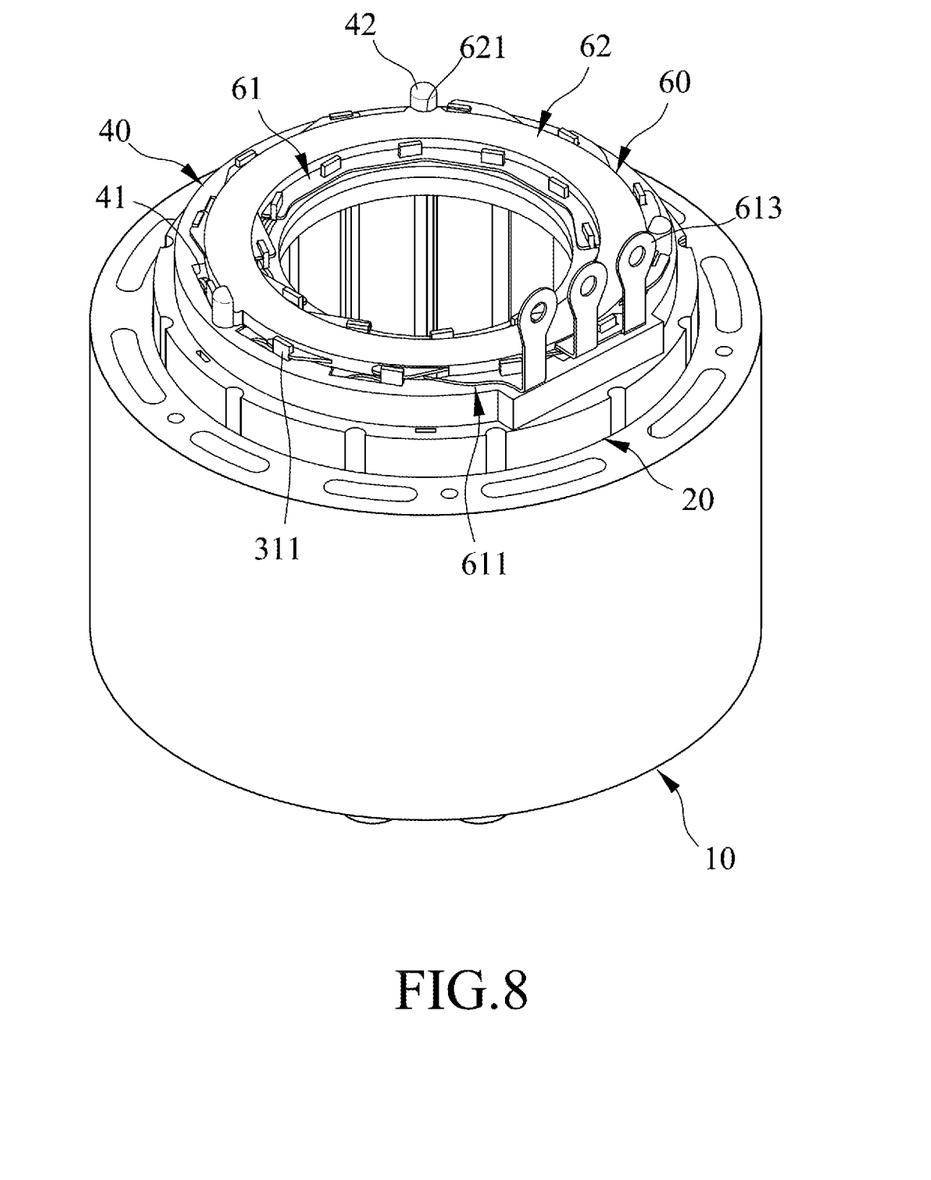
FIG. 8 is the same view as FIG. 1 but without illustrating a cover.

As shown in FIGS. 3 to 5, the electrical conductor set 60 is disposed on the insulating plate 50 and positioned by the positioning members 42 (see FIG. 8). The electrical conductor set 60 has a plurality of conductor layers 61, and an insulating part 62. As shown in FIGS. 3 to 6, the conductor layers 61 are spaced apart from each other in the axial direction of the stator yoke 20. Each of the conductor layers 61 has a plurality of conductor components 611 laid on a common plane. Each of the conductor components 611 has a peripheral edge and a plurality of connection holes 612. Each of the connection holes 612 is formed through a part of a corresponding one of the conductor components 611 away from the peripheral edge, or through the peripheral edge. One of the conductor components 611 of each of the conductor layers 61 has a bending connection terminal 613 forming an angle therewith. The insulating part 62 encapsulates all of the conductor layers 61 and is positioned between the positioning members 42. As shown in FIGS. 4 and 8, the insulating part 62 has at least two abutment portions 621, specifically, three abutment portions 621. Each of the abutment portions 621 corresponds in position to a corresponding one of the positioning members 42 and has a portion with a profile complementing that of the corresponding one of the positioning members 42. Each of the connection holes 612 of each of the conductor components 611 is exposed from the insulating part 62. One of the terminal legs 311 of the coil member 31 of each of the coil sets 30 extends through one of the connection holes 612 of one of the conductor components 611 of one of the conductor layers 61. The two terminal legs 311 of the coil member 31 of each of the coil sets 30 extend through the positioning plate 40 and respectively engage two of the connection holes 612 respectively formed in two of the conductor components 611 so that the two terminal legs 311 of each of the coil sets 30 are respectively connected to the two of the conductor components 611. Connections among the coil members 31 and the conductor components 611 can be arranged depending on a connection configuration predetermined by manufacturers. In this embodiment, the insulating part 62 is injection molded over all of the conductor layers 61 so that the electrical conductor set 60 is formed into a unitary structure.

As shown in FIGS. 3, 4, and 6, the cover 70 is disposed on the electrical conductor set 60, and has a terminal seat 71, a plurality of installation holes 72, a receiving recess 73, and a plurality of accommodating indentations 74. The terminal seat 71 has a plurality of wire connection recesses 711. The connection terminal 613 of one of the conductor components 611 of each of the conductor layers 61 extends into one of the wire connection recesses 711. Through the conductor components 611 of the conductor layers 61, the coil sets 30 can be electrically connected to an external load. The installation holes 72 are spaced at intervals and extend through the top cover 70. Each installation hole 72 corresponds in position and shape to one of the positioning members 42 for allowing passage of the corresponding one of the positioning members 42. The receiving recess 73 is concaved in a surface of the cover 70 facing the electrical conductor set 60. The receiving recess 73 has a profile complementing that of the insulating part 62 of the electrical conductor set 60. Each accommodating indentation 74 is concaved in the surface of the cover 70 facing the electrical conductor set 60. Each accommodating indentation 74 corresponds in position to one of the terminal legs 311 of the coil member 31 of one of the coil sets 30. When the cover 70 covers the electrical conductor set 60, the positioning members 42 of the positioning plate 40 extend through the cover 70, the insulating part 62 is received in the receiving recess 73, and one of the terminal legs 311 of the coil member 31 of each of the coil sets 30 is accommodated in a corresponding one of the accommodating indentations 74.

Because the electrical conductor set 60 is formed in a unitary structure (see FIG. 4), during assembling of the motor stator assembly of the disclosure, as shown in FIGS. 3, 7 and 8, the positioning plate 40, the insulating plate 50, the electrical conductor set 60, and the cover 70 are just required to be sequentially assembled on the stator yoke 20. Further, because the positioning members 42 of the positioning plate 40 are angularly spaced at unequal intervals and at least two positioning members 42 are different in shape, and because each abutment portions 621 of the insulating part 62 and each installation hole 72 of the cover 70 corresponds in position and in shape to the corresponding one of the positioning members 42, relative positions among the positioning plate 40, the electrical conductor set 60, and the cover 70 can be quickly and accurately identified, thereby saving assembly time during assembling of the motor stator assembly of the disclosure.

Figure 9:
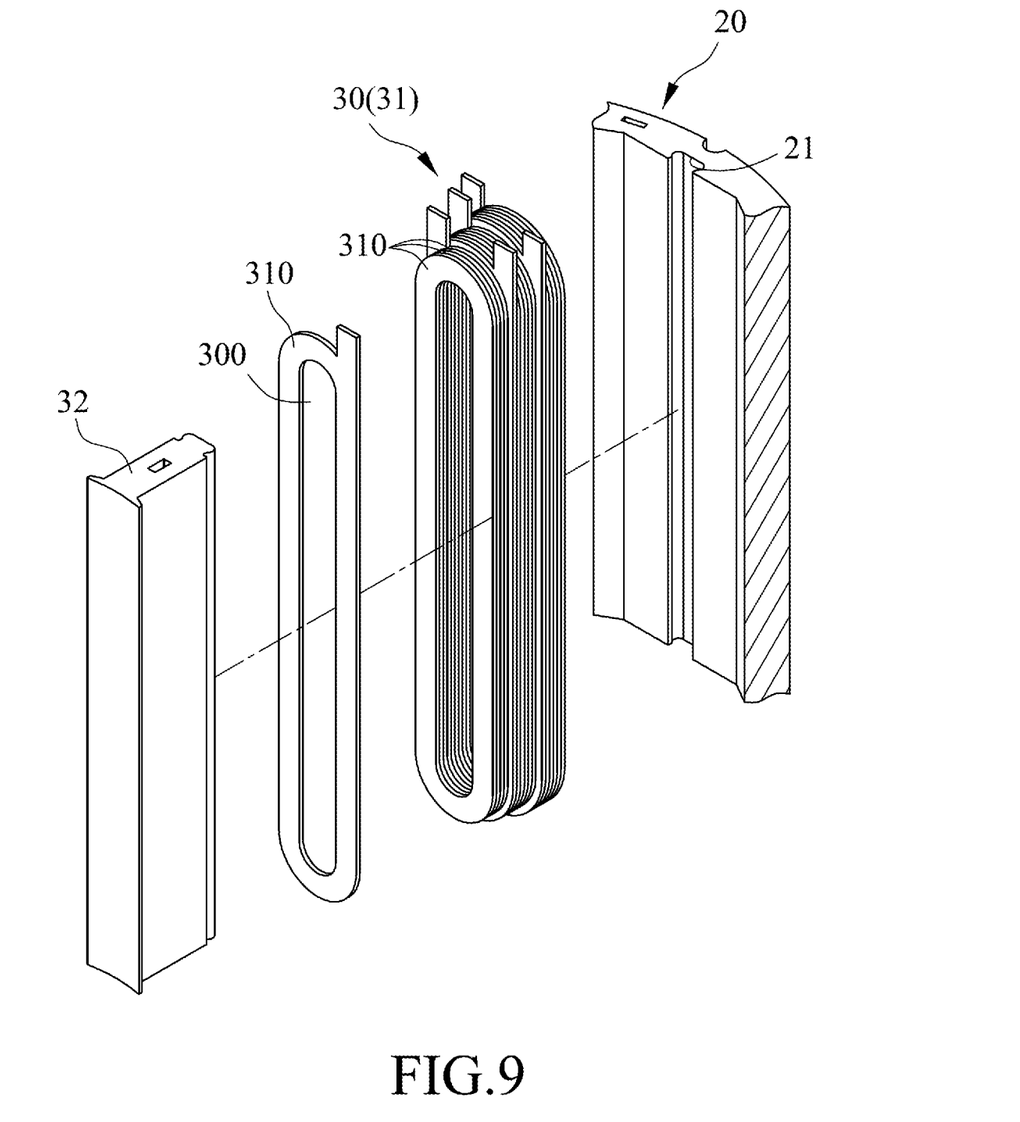
FIG. 9 is an enlarged perspective view of a motor stator assembly according to a second embodiment of the disclosure, illustrating one of the coil sets and a portion of the stator yoke.
Figure 10:
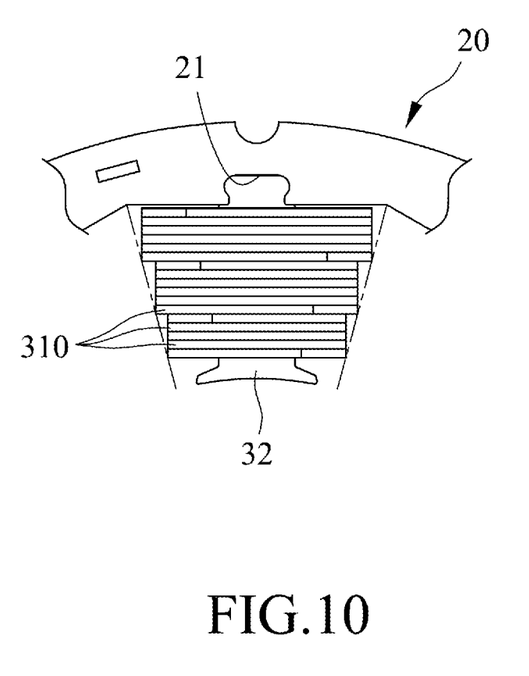
FIG. 10 is a fragmentary top view of the second embodiment illustrating the coil set connected to the portion of the stator yoke of the motor stator assembly.

FIGS. 9 and 10 illustrate a motor stator assembly according to a second embodiment of the disclosure. In the second embodiment, the coil member 31 of each of the coil sets 30 is composed of a plurality of loop-shaped plates 310 each having an outer periphery surrounding a through hole 300. The outer peripheries of the loop-shaped plates 310 have different sizes. The outer peripheries of the loop-shaped plates 310 decrease in size in a radially inward direction from an inner surface of the stator yoke 20. Because the outer peripheries of the loop-shaped plates 310 of the coil member 31 have different sizes and decrease in size in a radially inward direction from the inner surface of the stator yoke 20, each coil set 30 can have a configuration resembling a sector that tapers in a radially inward direction. This configuration allows the coil sets 30 to be densely arranged in a limited space inside the stator yoke 20 so that the efficiency of magnetic excitation can be increased.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A motor stator assembly, comprising:
    a stator yoke;
    a plurality of coil sets connected to said stator yoke, each of said coil sets having a coil member that has two terminal legs;
    a positioning plate removably connected to said stator yoke, and having a plurality of through openings and at least two positioning members, each of said through openings having a polygonal cross section, said terminal legs of said coil member of each of said coil sets extending through one of said through openings and respectively abutting two corners of said one of said through openings, said at least two positioning members being spaced apart from each other and protruding from said positioning plate in a direction away from said stator yoke; and
    an electrical conductor set disposed on said positioning plate and positioned by said at least two positioning members, and having a plurality of conductor layers and an insulating part, said conductor layers being spaced apart from each other in an axial direction of said stator yoke, each of said conductor layers having a plurality of conductor components, each of said conductor components having a plurality of connection holes, said insulating part encapsulating all of said conductor layers and being positioned between said at least two positioning members, each of said connection holes of each of said conductor components being exposed from said insulating part, one of said terminal legs of said coil member of each of said coil sets extending through one of said connection holes of one of said conductor components of one of said conductor layers;
    wherein said two terminal legs of said coil member of each of said coil sets extend through said positioning plate and respectively engage two of said connection holes respectively formed in two of said conductor components so that said two terminal legs of each of said coil sets are respectively connected to said two of said conductor components.

2. The motor stator assembly as claimed in claim 1, wherein:
    each of said conductor components has peripheral edge; and
    each of said connection holes is formed through a part of a corresponding one of said conductor components away from said peripheral edge, or through said peripheral edge.

3. The motor stator assembly as claimed in claim 1, further comprising an insulating plate disposed between said positioning plate and said electrical conductor set, said terminal legs of said coil member of each of said coil sets extending through said insulating plate.

4. The motor stator assembly as claimed in claim 1, further comprising a cover disposed on said electrical conductor set, said cover having a terminal seat that has a plurality of wire connection recesses, one of said conductor components of each of said conductor layers having a connection terminal extending into one of said wire connection recesses, said at least two positioning members of said positioning plate extending through said cover.

5. The motor stator assembly as claimed in claim 1, wherein said at least two positioning members of said positioning plate are angularly spaced at unequal intervals.

6. The motor stator assembly as claimed in claim 1, wherein said at least two positioning members of said positioning plate are different in shape.

7. The motor stator assembly as claimed in claim 1, wherein said positioning plate includes three positioning members, an angular distance between two adjacent ones of said positioning members being different from an angular distance between the other two adjacent ones of said positioning members.

8. The motor stator assembly as claimed in claim 7, wherein at least one of said positioning members is different in shape from the other one of said positioning members.

9. The motor stator assembly as claimed in claim 1, wherein said stator yoke has a plurality of engagement slots, each of said coil sets further having a stator tooth pole that is sleeved around by said coil member and that is removably engaged into one of said engagement slots.

10. The motor stator assembly as claimed in claim 9, wherein said coil member of each of said coil sets is composed of a plurality of loop-shaped plates each having an outer periphery surrounding a through hole, said outer peripheries of said loop-shaped plates having different sizes, the outer peripheries of said loop-shaped plates decreasing in size in a radially inward direction from an inner surface of said stator yoke.

\* \* \* \* \*